(12) United States Patent
Kamei

(10) Patent No.: US 11,314,468 B2
(45) Date of Patent: Apr. 26, 2022

(54) INFORMATION PROCESSING APPARATUS AND IMAGE FORMING APPARATUS

(71) Applicant: FUJIFILM Business Innovation Corp., Tokyo (JP)

(72) Inventor: Mitsuhisa Kamei, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 45 days.

(21) Appl. No.: 17/029,048

(22) Filed: Sep. 23, 2020

(65) Prior Publication Data

US 2021/0279015 A1    Sep. 9, 2021

(30) Foreign Application Priority Data

Mar. 3, 2020   (JP) .............................. JP2020-035672

(51) Int. Cl.
 *G06F 3/12* (2006.01)
 *G06F 21/10* (2013.01)

(52) U.S. Cl.
 CPC ............ *G06F 3/1225* (2013.01); *G06F 3/123* (2013.01); *G06F 3/1204* (2013.01); *G06F 21/105* (2013.01)

(58) Field of Classification Search
 CPC ...... G06F 3/1225; G06F 3/1204; G06F 3/123; G06F 21/105; G06F 2221/0706; G06F 2221/0793; G06F 21/10
 USPC ......................................................... 358/1.15
 See application file for complete search history.

(56) References Cited

U.S. PATENT DOCUMENTS

| | | | | |
|---|---|---|---|---|
| 9,633,291 B2* | 4/2017 | Mori | ...................... | G06F 3/129 |
| 10,498,709 B2 | 12/2019 | Fujii | | |
| 2006/0268304 A1* | 11/2006 | Tanaka | .................. | G06F 3/1229 |
| | | | | 358/1.13 |
| 2010/0220350 A1* | 9/2010 | Faridi | ................... | G06F 3/1205 |
| | | | | 358/1.15 |

FOREIGN PATENT DOCUMENTS

| JP | 2010-218465 | 9/2010 |
|---|---|---|
| JP | 2011-180905 | 9/2011 |
| JP | 5359427 | 12/2013 |
| JP | 5423479 | 2/2014 |
| JP | 6520746 | 5/2019 |

* cited by examiner

*Primary Examiner* — Neil R McLean
(74) *Attorney, Agent, or Firm* — JCIPRNET

(57) ABSTRACT

An information processing apparatus includes a processor and memory. The memory stores information on multiple image forming apparatuses capable of making an image forming request. The processor is configured to: install license-managed software; select an image forming apparatus serving as a license management server of the software from the multiple image forming apparatuses; and set the selected image forming apparatus as a license management server.

13 Claims, 12 Drawing Sheets

FIG. 4

| NAME | SETTING | IP ADDRESS | MFP NUMBER |
|---|---|---|---|
| MAIN PRINTER | DEFAULT | 172.27.143.1 | MF3075 |
| SPARE PRINTER 1 | | 172.27.145.10 | MF2032 |
| SPARE PRINTER 2 | | 172.27.212.2 | MF3076 |

FIG. 6

| PORT NO. | FUNCTION |
|---|---|
| 515 | IMAGE FORMATION |
| 8080 | HTTPS |
| 9200 | LICENSE MANAGEMENT |

FIG. 7

| SOFTWARE NAME | NUMBER OWNED | NUMBER ACTUALLY LICENSED |
|---|---|---|
| A | 10 | 3 |
| B | 5 | 4 |

FIG. 8

| TENANT ID | OPERATING MFP NO. | LICENSED SOFTWARE | NUMBER OWNED | NUMBER ACTUALLY LICENSED |
|---|---|---|---|---|
| 1001 | MF2032 | | | |
| | MF3075 | A | 10 | 3 |
| | | B | 5 | 4 |
| | MF3076 | A | 20 | 8 |
| | | B | 15 | 12 |
| 1002 | MF3387 MF3388 | ... | ... | ... |

FIG. 9

| TENANT ID | OPERATING MFP NO. | ACCEPTABLE OPERATION |
|---|---|---|
| 1001 | MF2032 MF3075 MF3076 | BROWSE・ADD・CHANGE DISTRIBUTION・CANCEL |
| 1002 | MF3387 MF3388 | BROWSE・ADD・CHANGE DISTRIBUTION・CANCEL |

FIG. 13

NO PRINTER SETTINGS ARE FOUND.
WOULD YOU LIKE TO SET A PRINTER FIRST?

| SET PRINTER | SET LICENSE MANAGEMENT SERVER | CANCEL |

FIG. 14

ENTER LICENSE MANAGEMENT SERVER

>

CANCEL  SET

INFORMATION PROCESSING APPARATUS AND IMAGE FORMING APPARATUS

CROSS-REFERENCE TO RELATED APPLICATIONS

This application is based on and claims priority under 35 USC 119 from Japanese Patent Application No. 2020-035672 filed Mar. 3, 2020.

BACKGROUND

(i) Technical Field

The present disclosure relates to an information processing apparatus and an image forming apparatus.

(ii) Related Art

License-managed software may be installed in information processing apparatuses such as personal computers (PCs). In addition, in an environment such as an office, an image forming apparatus including a printer and additionally including a scanner, a fax machine, and the like is often located around an information processing apparatus. A user using an information processing apparatus sends an image forming request (print request) via software to use an image forming apparatus.

By the way, Japanese Patent No. 5423479 describes license management of software installed in an image forming apparatus. Here, it is described that license management is performed using floating licensing by providing a management apparatus connected to a plurality of image forming apparatuses. If the number of allocatable licenses is insufficient, licenses are collected on the basis of information on the past record of collecting licenses from image forming apparatuses.

Suppose that license management of software installed in an information processing apparatus is partly performed by using an image forming apparatus located around the information processing apparatus. Since a plurality of image forming apparatuses may be located in an environment such as an office, it becomes necessary to consider which image forming apparatus should be used.

SUMMARY

Aspects of non-limiting embodiments of the present disclosure relate to making it easier to select an image forming apparatus that performs license management than the case where a user makes the selection.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor and memory. The memory stores information on a plurality of image forming apparatuses capable of making an image forming request. The processor is configured to: install license-managed software; select an image forming apparatus serving as a license management server of the software from the plurality of image forming apparatuses; and set the selected image forming apparatus as a license management server.

BRIEF DESCRIPTION OF THE DRAWINGS

An exemplary embodiment of the present disclosure will be described in detail based on the following figures, wherein:

FIG. 4 is a diagram illustrating an example of setting a printer in the PC;

FIG. 6 is a diagram illustrating exemplary communication ports of the multifunctional peripheral;

FIG. 7 is a diagram illustrating exemplary data managed in a license ownership/usage database (DB);

FIG. 8 is a diagram illustrating exemplary data managed in a license DB of an integrated management server;

FIG. 9 is a diagram illustrating exemplary information managed by a portal site;

FIG. 13 is a diagram illustrating a display example in the case where no printer has been set;

FIG. 14 is a diagram illustrating an exemplary screen for setting the license management server;

DETAILED DESCRIPTION

(1) Configuration of Information Processing System

Figure 1:
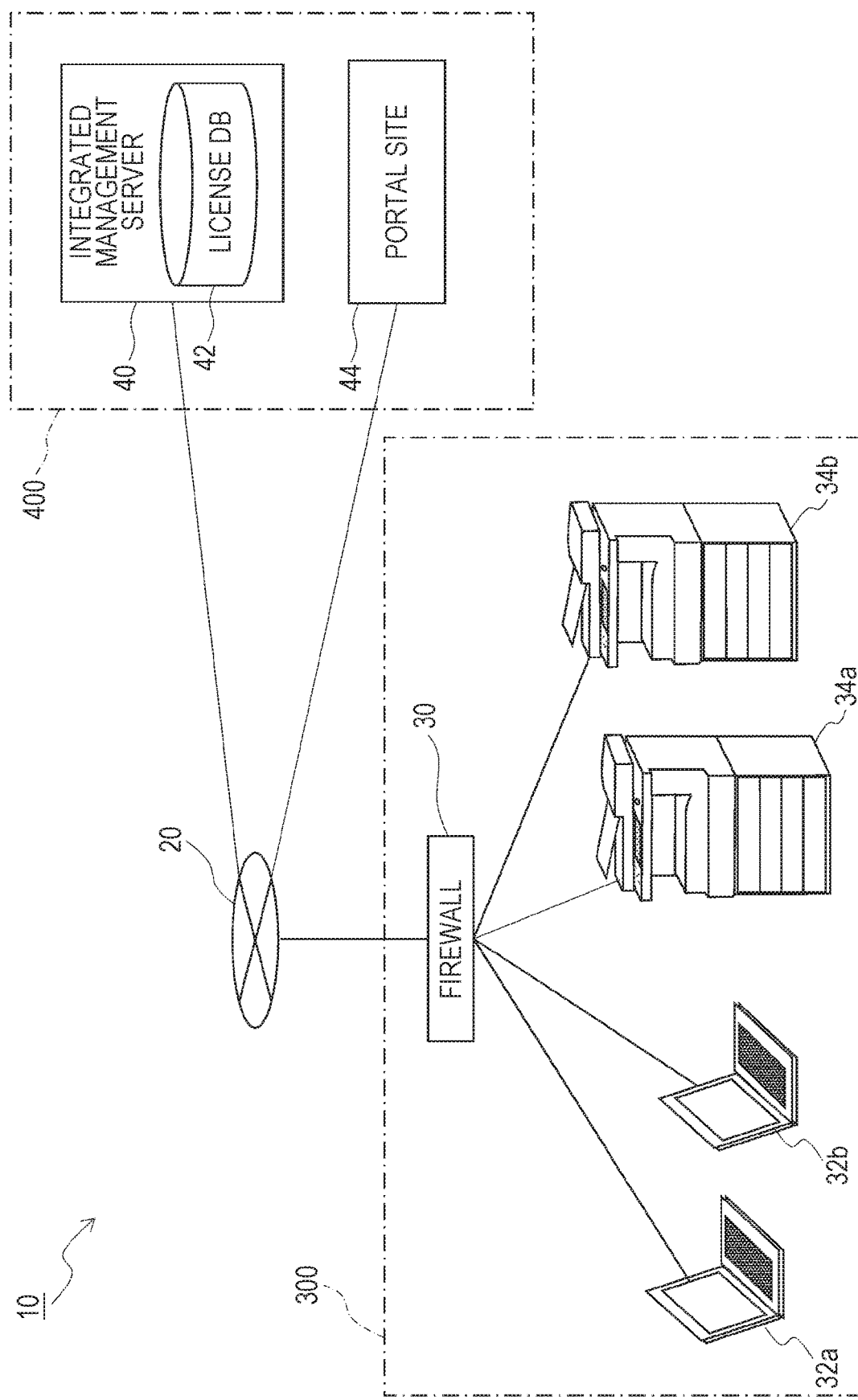
FIG. 1 is a diagram illustrating the overall configuration of an information processing system according to an exemplary embodiment.

FIG. 1 is a diagram illustrating a schematic configuration of an information processing system 10 according to an exemplary embodiment. In the example illustrated in FIG. 1, a user company 300, which uses certain software, and a providing company 400, which provides the software, are illustrated. The user company 300 pays a license fee to the providing company 400 to obtain a license for using software. The information processing system 10 is a system configured to enable use of the software. The information processing system 10 is connected to a network 20 such as the Internet and is configured to be capable of performing communication.

The information processing system 10 includes a firewall 30, a plurality of personal computers (PCs) 32a and 32b, and a plurality of multifunctional peripherals 34a and 34b, which are provided in the user company 300. The PCs 32a and 32b (hereinafter may also be referred to simply as PCs 32 when it is not necessary to distinguish between the PCs 32a and 32b) are information processing apparatuses used by users of software, who belong to the user company 300. Typically, a user logs in to a PC 32 to use software installed in the PC 32.

The multifunctional peripherals 34a and 34b (hereinafter may also be referred to simply as multifunctional peripheral 34 when it is not necessary to distinguish between the multifunctional peripherals 34a and 34b) are image forming apparatuses used in the user company 300. Because the multifunctional peripherals 34 are provided not only with an image processing function of an image forming apparatus (hereinafter may alternatively be referred to as a printer), but also with at least one another image processing function of, for example, a scanner, a fax machine, and the like, the multifunctional peripherals 34 are called so. The multifunctional peripherals 34 are used by users. For example, a user gives a print command from a PC 32 to any of the multifunctional peripherals 34 to execute printing. As will be described later, the multifunctional peripherals 34 serve as license management servers of software used on the PCs 32. The multifunctional peripherals 34 are apparatuses located within a local network of the user company 300, and communication with the multifunctional peripherals 34 may be easily performed. In addition, the multifunctional peripherals 34 have security advantages since reverse engineering is not easily performed, as compared with the general PCs 32.

The information processing system 10 additionally includes an integrated management server 40, a license database (DB) 42 included in the integrated management server 40, and a portal site 44, which are provided in the providing company 400. The integrated management server 40 is an apparatus that integrally manages software licenses. The integrated management server 40 is in charge of controlling the multifunctional peripherals 34, which are license management servers that are locally provided, and therefore is called so. From another perspective, it may be said that the integrated management server 40 is a global license management server.

The license DB 42 is a database (DB) referred to by the integrated management server 40. The license DB 42 stores licensed software information, user information, and license expiration date information.

The portal site 44 is a portal or a site for providing information on licenses to users via the network 20. The portal site 44 may provide information on the latest licenses to users by appropriately referring to the license DB 42. In addition, the portal site 44 is also used by users to make a license contract, to cancel the license, etc. Specific examples will be described later.

Figure 2:
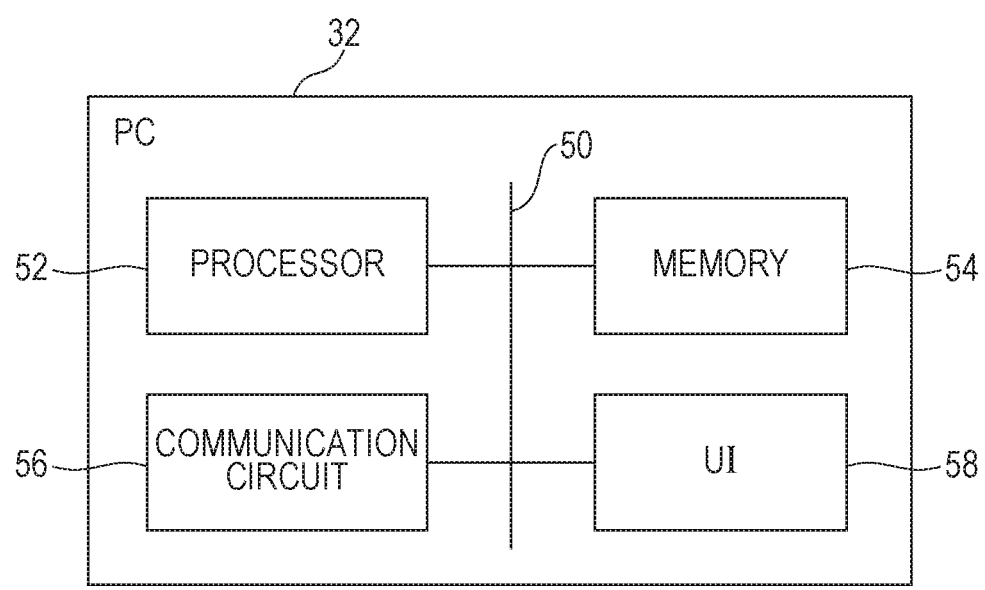
FIG. 2 is a diagram illustrating the hardware configuration of a PC.
Figure 3:
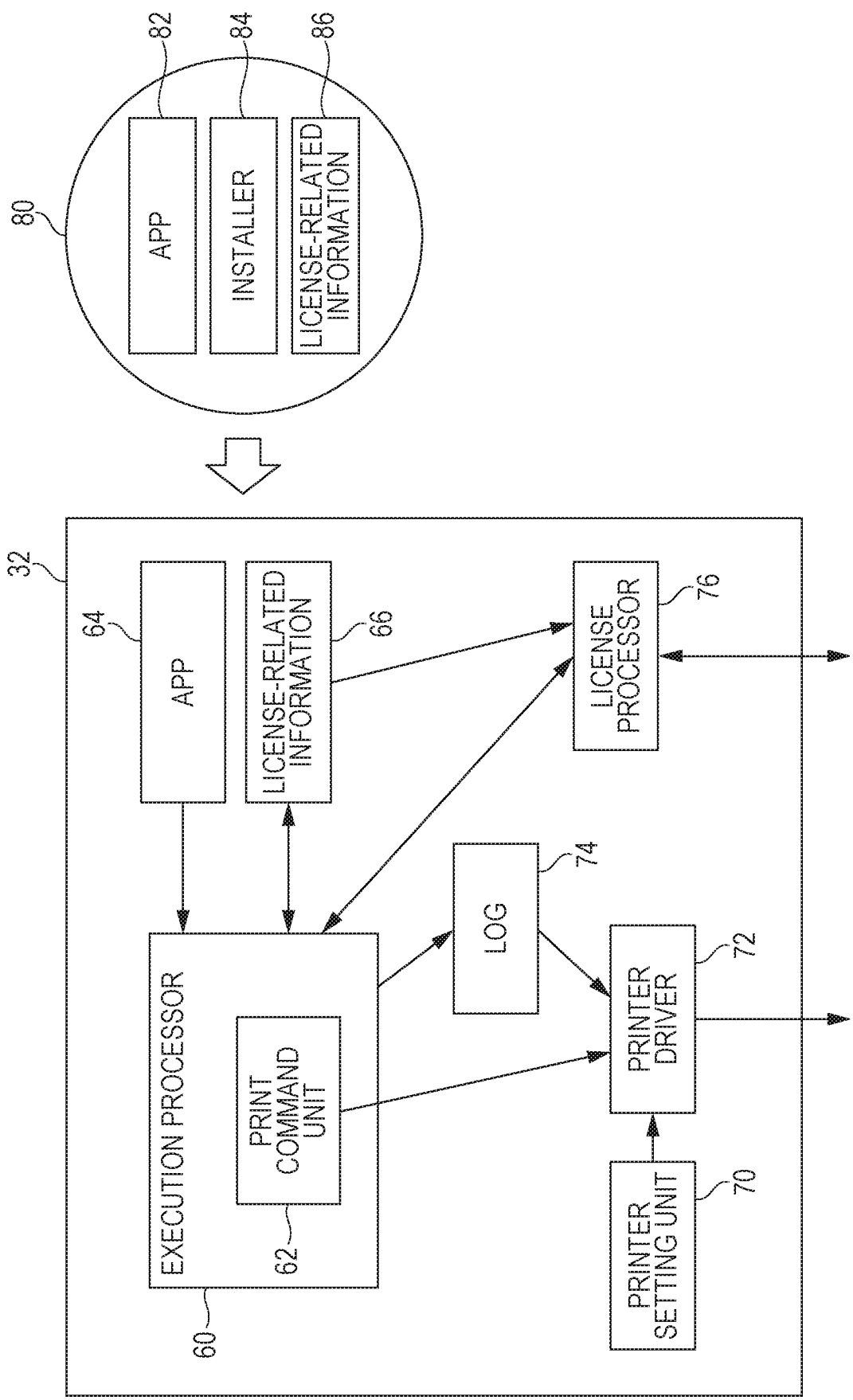
FIG. 3 is a diagram illustrating the functional configuration of the PC.

Referring next to FIGS. 2 and 3, each PC 32 will be described in detail. FIG. 2 is a diagram illustrating the schematic hardware configuration of the PC 32. The PC 32 includes a bus 50, which serves as an internal communication path, and further includes a processor 52, memory 54, a communication circuit 56, and a user interface (UI) 58, which are connected to the bus 50.

The processor 52 refers to a processor in a broad sense, and includes general processors (such as a central processing unit (CPU)) and dedicated processors (such as a graphics processing unit (GPU), an application specific integrated circuit (ASIC), a field programmable gate array (FPGA), and a programmable logic device). The operation of the processor 52 may be implemented by one processor, or by plural processors in collaboration which are located physically apart from each other but may work cooperatively. The order of operations of the processor 52 is not limited to one described in the exemplary embodiment above, and may be changed as appropriate.

The memory 54 refers to memory in a broad sense, and is a device with a data storage function, such as semiconductor memory and a hard disk drive. Although the PC 32 may include multiple semiconductor memory devices and a hard disk drive, these are symbolically described as the memory 54 in FIG. 2.

The communication circuit 56 is a circuit for performing wireless or wired communication between the PC 32 and an external apparatus. The UI 58 is a device such as a touchscreen, a keyboard, and a mouse.

These pieces of computer hardware in the PC 32 operate under control of software such as an operating system (OS) and application programs installed in the PC 32. A user checks the processing operation of the PC 32 or software via the UI 58, and gives an operation command to the PC 32 or software.

FIG. 3 is a diagram describing the functional configuration of the PC 32 realized by software. The exemplary embodiment assumes a situation where a certain application program (hereinafter may be referred to as an "app") is installed as license-managed software in the PC 32. To this end, FIG. 3 illustrates the functional configuration of the PC 32, focusing on functions for using the app.

In the PC 32, an execution processor 60, an app 64, license-related information 66, a printer setting unit 70, a printer driver 72, a log 74, and a license processor 76 are formed. The execution processor 60 is configured to execute and process the app 64 and the like. The execution processor 60 is provided with a print command unit 62, with which printing for the app 64 may be executed.

The app 64 is software installed in the PC 32. The type of the app 64 is not particularly limited. Examples of the app 64 include document creation software, spreadsheet software, and image processing software. It is assumed that the app 64 is license-managed software.

The license-related information 66 is information regarding the license of the app 64. The license-related information 66 includes the version information, user information, license expiration date information, and license management server information of the app 64.

The printer setting unit 70 is configured to set a printer used by the PC 32. Accordingly, the PC 32 may select and use the multifunctional peripherals 34a and 34b. The printer setting unit 70 may set a "default printer". A default printer refers to a printer set to be regularly used.

Here, with reference to FIG. 4, an example of setting a printer by the printer setting unit 70 will be described. FIG. 4 is a diagram illustrating an exemplary setting made by the printer setting unit 70 in a table format. In FIG. 4, fields for the name, setting, Internet Protocol (IP) address, and multifunctional peripheral number are provided, and a plurality of multifunctional peripherals 34 are registered. The name is the name of a printer given by a user (or the user company 300). In the example illustrated in FIG. 4, three printers, namely, a main printer, a spare printer 1, and a spare printer 2, are registered. The printers correspond to, for example, the multifunctional peripherals 34a and 34b illustrated in FIG. 1.

The setting field is a field for setting a default printer. In the example illustrated in FIG. 4, a printer named "main printer" is set as a default printer. Therefore, the PC 32 uses this printer to perform printing in response to a print command unless special settings are made.

In the IP address field, an IP address given to each printer is registered. The PC 32 uses this IP address to communicate with a corresponding printer.

In the multifunctional peripheral number field, a number indicating the model name or the like of a multifunctional peripheral 34 is registered. By referring to the multifunctional peripheral number, which manufacturer and which model the printer is may be grasped. In the example illustrated in FIG. 4, the following multifunctional peripheral numbers are set: MF3075 for the main printer, MF2032 for the spare printer 1, and MF3076 for the spare printer 2.

Referring back to FIG. 3, the description will be continued. The printer driver 72 is software for allowing a printer to perform printing. In many cases, printer manufacturers provide the printer driver 72 for each printer model. By installing the printer driver 72, the PC 32 becomes able to use a corresponding printer. The printer driver 72 receives a print command from the print command unit 62 of the execution processor 60, and sends print data to a corresponding printer to perform printing.

The log 74 is data recording an operation performed by the execution processor 60. For example, in response to activation of the app 64, the activation date and time are recorded in the log 74. In addition, a detailed operation on the activated app 64 may also be recorded in the log 74. Data of the log 74 is sent to the printer driver 72 when the print command unit 62 gives a print command. When the printer driver 72 sends data of the log 74 to a corresponding printer, the printer performs management based on floating licensing, as will be described later.

The license processor 76 performs license processing of the app 64. Specifically, in the case of installing the app 64, an appropriate multifunctional peripheral 34 is selected and set to be used as a local license management server. Selection of a multifunctional peripheral 34 may be performed in various manners. For example, priority information may be set to allow selection of a multifunction peripheral 34 having higher priority. Examples of the priority information include information on a default printer set by the printer setting unit 70, and information on the actual frequency of use of a printer. In addition, modes based on the following are also conceivable: availability information indicating the availability of a function to serve as a license management server; requirement information defining requirements as a license management server set in an installer 84; information indicated by a printer driver; information indicating whether there is a communication port for a license management server; and information indicating whether there is an IP address for a license management server.

In the case where the app 64 is activated, the license processor 76 further refers to the license-related information 66 to ask an external license management server about the license permission situation or the like. If the license processor 76 confirms that the license is permitted, the PC 32 is allowed to use the app 64. In contrast, if it is confirmed that the license is not permitted or the user is trying to use the app 64 while exceeding the number of permitted licenses, the PC 32 is not allowed to use the app 64.

The app 64 and the license-related information 66 are installed in the PC 32 through a recording medium 80 such as a compact-disc read-only memory (CD-ROM) or a digital versatile disc (DVD), or through downloading from a network. For example, an app 82, the installer 84, and license-related information 86 are recorded in the recording medium 80. The manufacturer name, the model name, and so forth of a multifunctional peripheral 34 usable as a license management server are described as needed in the installer 84 or the license-related information 86. By running the installer 84, which is an installing program, on the PC 32, the app 64 and the license-related information 66 are installed in the PC 32.

Figure 5:
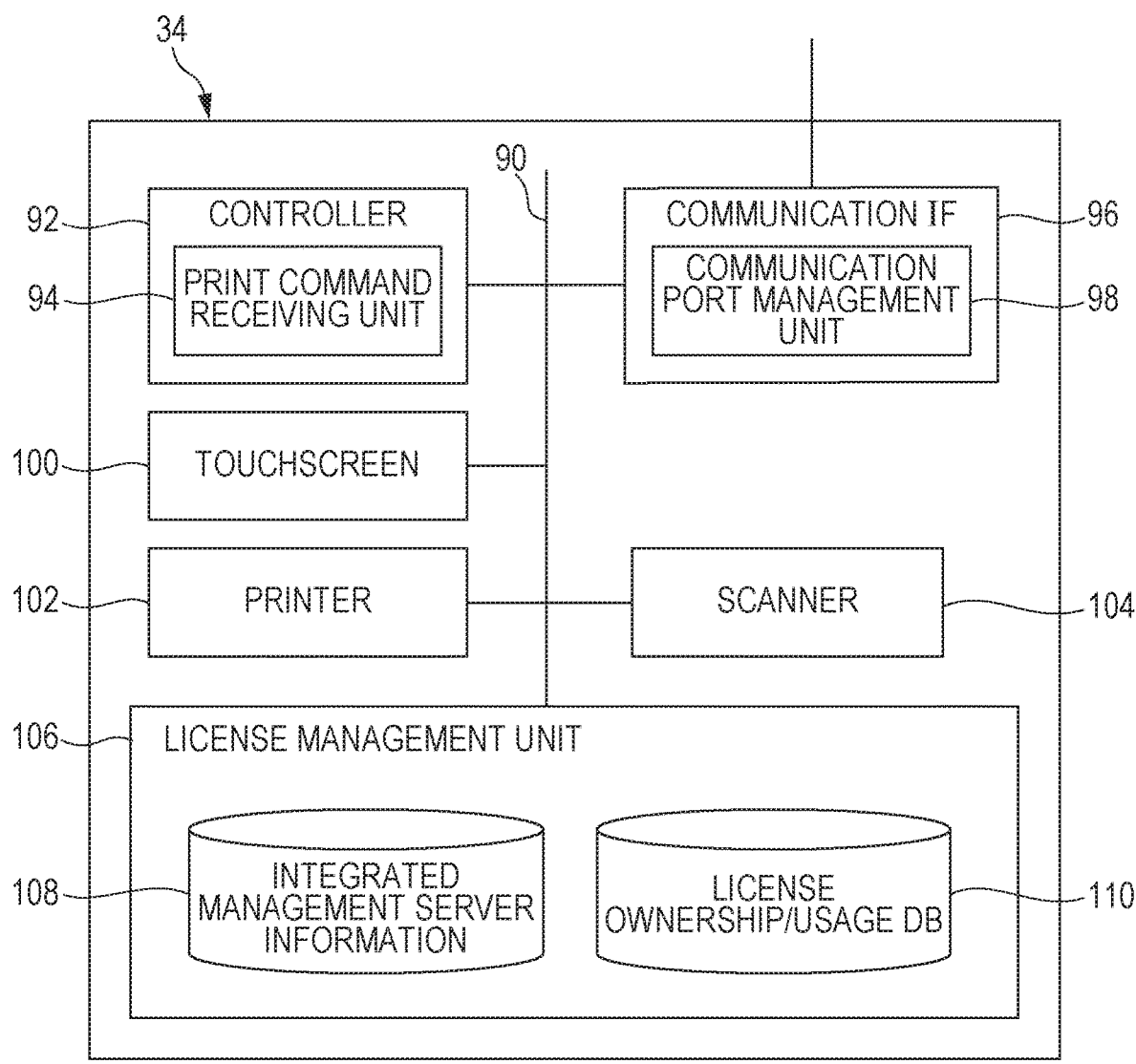
FIG. 5 is a diagram illustrating the configuration of a multifunctional peripheral.

Referring next to FIG. 5, the configuration of each multifunctional peripheral 34 will be described. FIG. 5 is a block diagram illustrating the configuration of the multifunctional peripheral 34. The multifunctional peripheral 34 includes a bus 90, and also includes a controller 92, a communication interface (IF) 96, a touchscreen 100, a printer 102, a scanner 104, and a license management unit 106, which are connected to the bus 90. Among these units, the controller 92, the communication IF 96, the touchscreen 100, the printer 102, and the scanner 104 constitute an image forming mechanism. In addition, the license management unit 106 constitutes a license management mechanism.

The controller 92 is a unit that controls the elements of the multifunctional peripheral 34. The controller 92 includes a processor and memory, and operates by controlling the processor and the memory under software. The memory and the processor are used in a broad sense, as in the case of the PC 32.

The controller 92 includes a print command receiving unit 94. The print command receiving unit 94 receives a print command from the PC 32 via the communication IF 96. When the print command receiving unit 94 receives a print command, the controller 92 instructs the printer 102 to execute printing. In addition, the controller 92 receives various commands, such as a copy command and a scan command, from the touchscreen 100, thereby allowing the printer 102 and the scanner 104 to operate.

The communication IF 96 includes a communication circuit and is configured to communicate with an external apparatus under software control. The communication IF 96 is connected to the firewall 30 via a communication cable or wirelessly. The communication IF 96 is provided with a communication port management unit 98. The communication port management unit 98 manages a port for receiving communication from the PC 32 or the like.

FIG. 6 is a diagram illustrating exemplary communication ports managed by the communication port management unit 98. In the example illustrated in FIG. 6, the items "port number" and "function" are provided. A port number indicates a communication port, and three communication ports, namely, 515, 8080, and 9200, are set. Among these ports, 515 is a communication port for receiving image formation (e.g., a print command); 8080 is a communication port for receiving communication using Hypertext Transfer Protocol Secure (https) protocol; and 9200 is a communication port for receiving communication regarding license management. By setting the communication ports as above, communication of the multifunctional peripheral 34 may be performed using a port according to a function, thereby facilitating the communication management and improving security.

Referring back to FIG. 5, the description will be continued. The touchscreen 100 is a user interface device that includes a display capable of displaying an image and a detection mechanism that detects a user operation on the display. The touchscreen 100 is provided at a position striking to the user's eyes, which is around the top of the multifunctional peripheral 34. Various operation buttons for operating the multifunctional peripheral 34 are displayed on the touchscreen 100, and the user operates these operation buttons. The touchscreen 100 is also capable of displaying messages to the user.

The printer 102 is a device that forms an image on a medium such as a sheet of paper. When the print command receiving unit 94 receives a print command, or when a copy command is given from the touchscreen 100, the printer 102 executes printing and ejects a sheet of paper on which an image has been formed.

The scanner 104 is a device that reads characters, images, and so forth that are written or drawn on a sheet of paper set at a certain position, and converts the read characters, images, and so forth to electronic data.

The license management unit 106 is a device that manages license owned by the PC 32, and allows the multifunctional peripheral 34 to function as a local license management server. The license management unit 106 is configured by controlling memory and a processor under software. The memory and the processor used may be the same as or different from the memory and the processor included in the controller 92. The license management unit 106 includes integrated management server information 108 and a license ownership/usage DB 110. The integrated management server information 108 is information for performing communication with the integrated management server 40, and includes the IP address and authentication information of the integrated management server 40. The license ownership/usage DB 110 is a database that stores information for checking whether each user has a license of an app. Floating licensing is adopted in the exemplary embodiment. The license ownership/usage DB 110 stores, for an app being licensed, information on the number of permittable licenses and the number of licenses that are actually permitted. Note that floating licensing refers to a system in which software may be installed or activated within the range of the number of contracted licenses.

Referring now to FIG. 7, exemplary information managed by the license ownership/usage DB 110 will be described. In FIG. 7, it is assumed that the multifunctional peripheral 34 manages the licenses of two apps. The names of these two apps (namely, A and B) are registered in the software name field. The number-owned field indicates the number of licenses that the multifunctional peripheral 34 may license. In the example illustrated in FIG. 7, ten licenses of app A and five licenses of app B are owned. The number actually licensed indicates the number of licenses that are actually licensed. That is, the total number of licenses used by a plurality of users is indicated. In the example illustrated in FIG. 7, three licenses of app A and four licenses of app B are used. The number actually licensed increases when users activate software and decreases when the users terminate the software. The multifunctional peripheral 34 permits licenses to PCs 32 used by users within the range in which the number actually licensed does not exceed the number owned.

Next, license management performed by the integrated management server 40 will be described. FIG. 8 is a diagram illustrating exemplary data managed by the license DB 42 of the integrated management server 40. In FIG. 8, the fields of the tenant ID, operating multifunctional peripheral number, to-be-licensed software, number owned, and number actually licensed are provided.

The tenant ID is an identification number for identifying a company or the like that has a contract (referred to as a tenant). In the example illustrated in FIG. 8, two tenant IDs, namely, 1001 and 1002, are set. In the exemplary embodiment, it is assumed that 1001 is the user company 300 illustrated in FIG. 1.

The operating multifunctional peripheral number indicates the number of a multifunctional peripheral 34 operating as a local license management server at each tenant. For example, the user company 300, which has the tenant ID 1001, has registered therein three multifunctional peripherals 34 whose multifunctional peripheral numbers are MF2032, MF3075, and MF3076, respectively. These correspond to the multifunctional peripheral numbers illustrated in FIG. 4.

The name of a to-be-licensed app is set in the to-be-license software field. The number owned and the number actually licensed indicate, as in the example illustrated in FIG. 7, the number of permitted licenses and the number of actually licensed licenses of each app. For example, for a multifunctional peripheral 34 with the multifunctional peripheral number MF3075, the following are set: the number owned is ten and the number actually licensed is three for app A; and the number owned is five and the number actually licensed is four for app B. It is assumed that the multifunctional peripheral MF3075 corresponds to the multifunctional peripheral 34 illustrated in FIG. 7, and these numerals match those illustrated in FIG. 7. From the viewpoint that the one that directly performs license management of the PC 32 is the multifunctional peripheral 34, it is not necessary to immediately reflect information on the multifunctional peripheral 34 in the license DB 42 of the integrated management server 40. Note that, because processing at the portal site 44 is performed by referring to the license DB 42 in the exemplary embodiment, information in the license ownership/usage DB 110 of the multifunctional peripheral 34 is immediately reflected in the license DB 42.

In the example illustrated in FIG. 8, the user company 300 sets the number of licenses owned to a multifunctional peripheral 34 with the multifunctional peripheral number MF3076, and performs license management. It is assumed that both MF3075 and MF3076 are multifunctional peripherals 34 capable of performing license management, and license management is performed in a distributed manner. Because the number of users using the multifunctional peripheral MF3076 is great, a large number of licenses is allocated to the multifunctional peripheral MF3076. In floating licensing, a contract is made only on the total number of licenses for the user company 300, and distribution of the number of licenses among a plurality of multifunctional peripherals 34 is changeable according to the usage. As will be described later, the distribution is changed on the basis of the log 74 illustrated in FIG. 3. In contrast, in the example illustrated in FIG. 8, the number of licenses is not allocated to a multifunctional peripheral 34 with the multifunctional peripheral number MF2032. This is because, for example, the multifunctional peripheral 34 with the multifunctional peripheral number MF2032 is incapable of performing license management, or multifunctional peripherals 34 that perform license management are narrowed down.

Referring next to FIG. 9, the portal site 44 will be described. FIG. 9 is a diagram illustrating exemplary information managed by the portal site 44. Here, tenant IDs, operating multifunctional peripheral numbers, and acceptable operations are set. After being authenticated, the user company 300 or the like accesses the portal site 44, thereby browsing the multifunctional peripheral numbers in the user company 300 (as described above, 1001 is allocated as the tenant ID). In this case, the portal site 44 obtains the latest information from the license DB 42 and displays the information. In addition, the portal site 44 allows the following operations, as indicated in the acceptable operation field: browsing the number owned and the number actually licensed; adding a number to the number owned; changing the distribution among multifunctional peripherals 34; and cancelling a license. In response to a command to add a number to the number of licenses, to change the distribution, or to cancel a license, information is sent to the integrated management server 40 to update the license DB 42. In addition, information such as "You will get a discount if you sign N more licenses (N is a positive integer)" is displayed at the portal site 44.

In the above description, it is assumed that, as has been described using FIGS. 5 and 6, the multifunctional peripheral 34 is provided with a plurality of communication ports by the communication port management unit 98 of the communication IF 96. Therefore, in order to communicate with the multifunctional peripheral 34, communication is performed in such a manner that, using the same IP address, a communication port for image formation is used in the case of giving a print command or the like, and a communication port for license management is used in the case of performing license management or the like. However, other communication modes may be adopted by the multifunctional peripheral 34.

Figure 10:
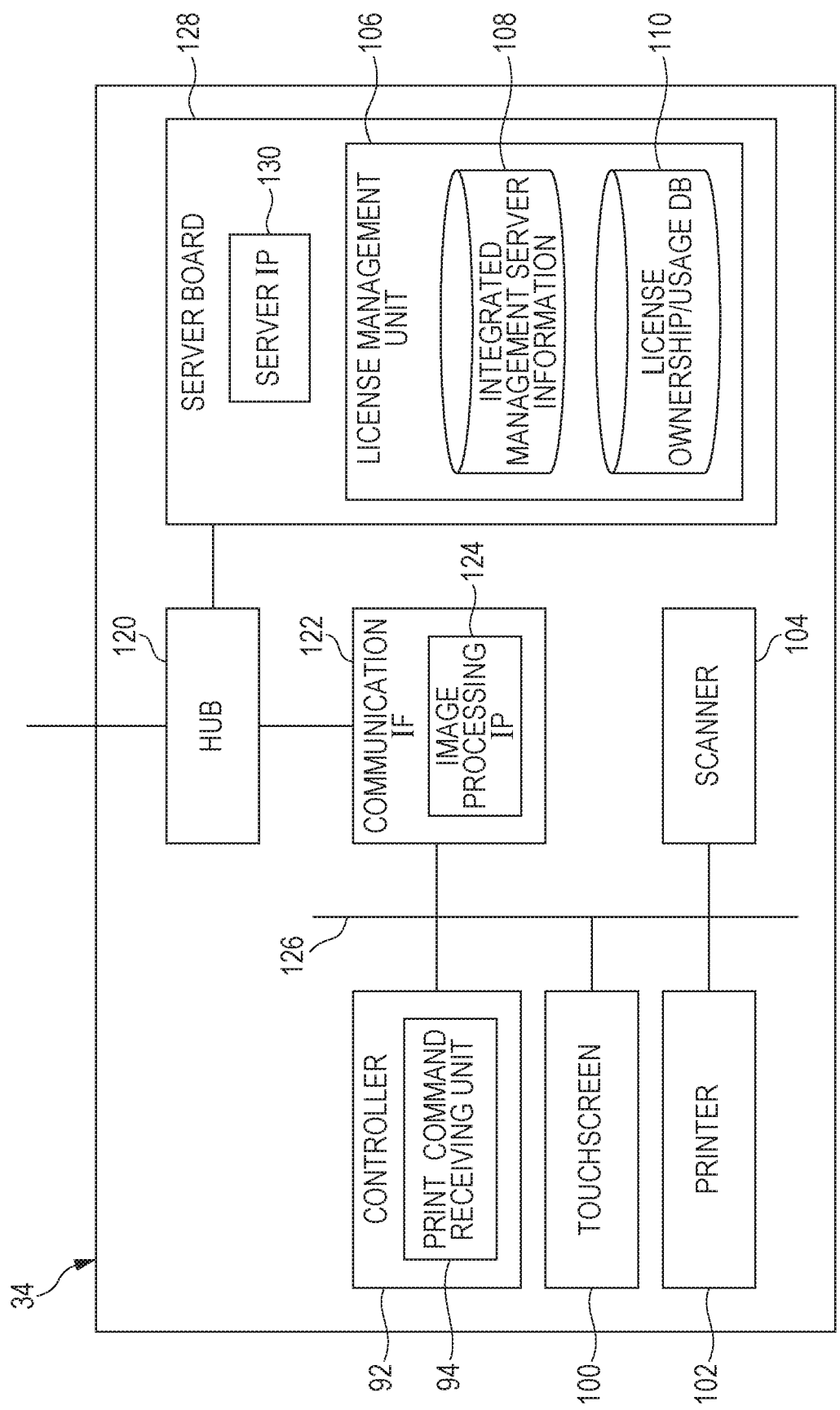
FIG. 10 is a diagram illustrating another exemplary configuration of the multifunctional peripheral.

FIG. 10 is a diagram illustrating the configuration according to a modification mode of the multifunctional peripheral 34. In FIG. 10, configurations that are the same as or that correspond to those in FIG. 5 are given the same reference numeral, and a description thereof is omitted or simplified.

The multifunctional peripheral 34 illustrated in FIG. 10 is provided with a hub 120, unlike FIG. 5. The hub 120 is connected to one communication path on the external side and is connected to two communication paths on the internal side of the multifunctional peripheral 34. One communication path is connected to a communication IF 122, and the communication IF 122 is connected to a bus 126. The bus 126 is connected to the controller 92, the touchscreen 100, the printer 102, and the scanner 104. In addition, the other communication path is connected to a server board 128, and the server board 128 is provided with the license management unit 106.

The hub 120 is a device that switches communication with the outside by performing switching based on an IP address. The hub 120 is connected to the communication IF 122 and the server board 128. The communication IF 122 is connected to the bus 126.

The communication IF 122 is a communication circuit provided for the image processing function of the multifunctional peripheral 34, such as the printer 102 and the scanner 104, and operates under control of software. An image processing IP 124, which is an IP address for communicating with the image processing function side, is set to the communication IF 122.

The server board 128 is a board provided for a license management server. The server board 128 is provided with computer hardware including a processor and memory, and is controlled under an operating system (OS) and an app. As a result, a server IP 130, which is an IP address for communicating with the server board 128, is set to the server board 128. In addition, the license management unit 106 is configured on the server board 128.

In the configuration illustrated in FIG. 10, the image processing IP 124 is used to communicate with the multifunctional peripheral 34 in the case of performing communication for image processing, such as giving a print command, and the server IP 130 is used to communicate with the multifunctional peripheral 34 in the case of performing communication for license management. The hub 120 switches the communication path in accordance with the IP address. Even in the configuration illustrated in FIG. 10, multiple communication ports may be further set; however, from the viewpoint of distinguishing a print command and license management, it is not necessary to provide communication ports.

Distinguishing communication for a print command and communication for license management may be implemented in other modes. In one exemplary mode, these two types of communication may be distinguished by making two communication protocols different. Needless to say, communication for a print command and communication for license management may be performed using the same IP address, the same communication port, and the same communication protocol. The exemplary embodiment described below may be implemented regardless of selection by communication port, selection by IP address, or selection by protocol.

(2) Setting License Management Server

Next, a procedure for setting a multifunctional peripheral 34 serving as a license management server in the PC 32 will be described. The user company 300 collectively purchases a plurality of licenses, and makes a contract for performing license management using the multifunctional peripherals 34. In this case, the providing company 400 makes settings for registering information on the user company 300 in the license DB 42. At the same time, the providing company 400 makes settings necessary for the license management unit 106 of the multifunctional peripherals 34 with the multifunctional peripheral numbers MF3075 and MF3076 by performing remote operations or the like. Accordingly, the multifunctional peripherals 34 start operating as license management servers.

After that, a user who belongs to the user company 300 installs a licensed app in a PC 32 that the user uses. In the installing process, the PC 32 performs a process of selecting a multifunctional peripheral 34 and setting this multifunctional peripheral 34 to serve as a license management server. Selection of a multifunctional peripheral 34 may be performed in various manners, and an exemplary selection mode will be discussed below.

Figure 11:
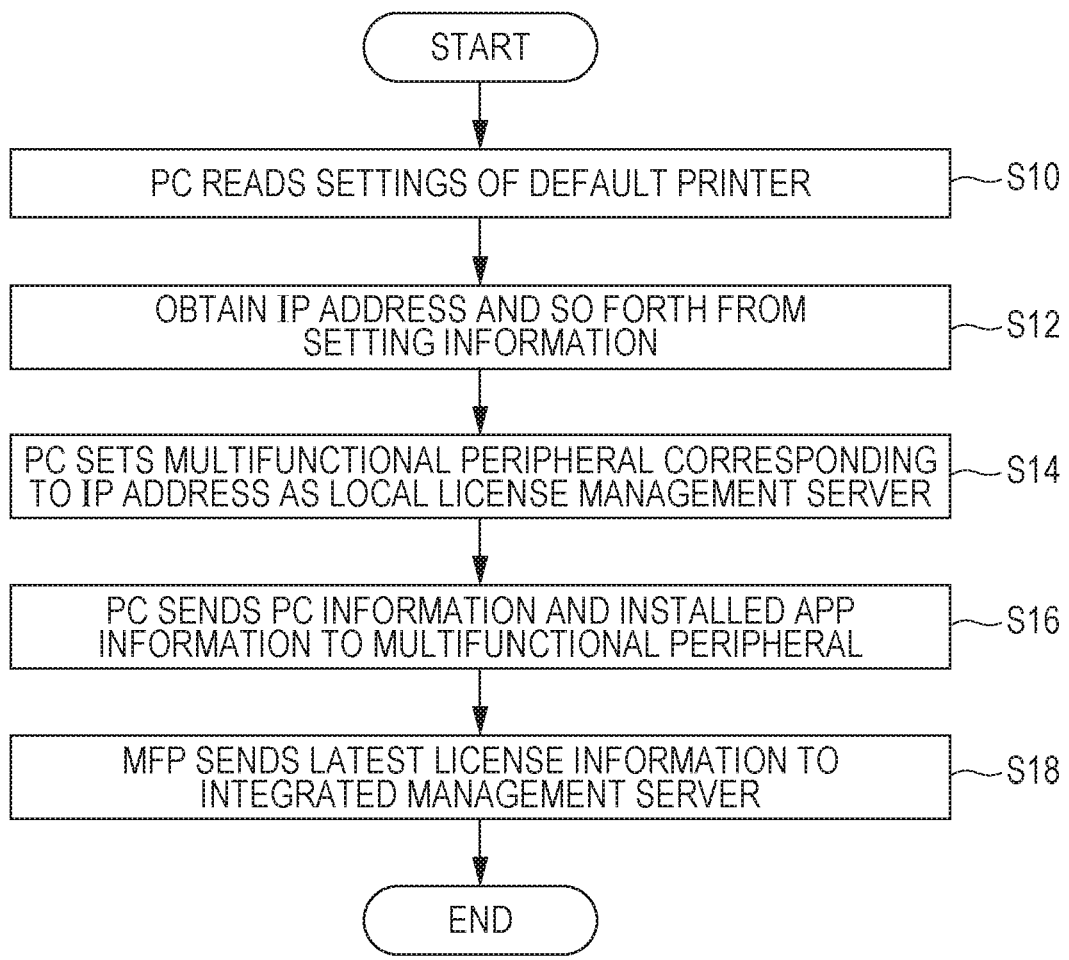
FIG. 11 is a flowchart illustrating an exemplary process of setting a license management server.

FIG. 11 is a flowchart illustrating an example in the case of using information on a default printer as priority information. At first, the PC 32 refers to the printer setting unit 70 to read the settings of a default printer (S10). In the example illustrated in FIG. 4, the settings of a printer named "main printer" are read. From the setting information, the IP address of the default printer (172.27.143.1 in the example illustrated in FIG. 4) is obtained (S12). The license processor 76 of the PC 32 sets this multifunctional peripheral 34 as a license management server (S14). In addition, the license processor 76 sends the local PC information and installed app information to the multifunctional peripheral 34 serving as a license management server (S16). In the multifunctional peripheral 34, the license management unit 106 updates the license ownership/usage DB 110 on the basis of the received information (S18). Now, the framework is in place to use the installed app.

In the exemplary embodiment illustrated in FIG. 11, if a default printer has been set, a license management server is also set immediately. Therefore, the user may promptly complete the license setting.

Figure 12:
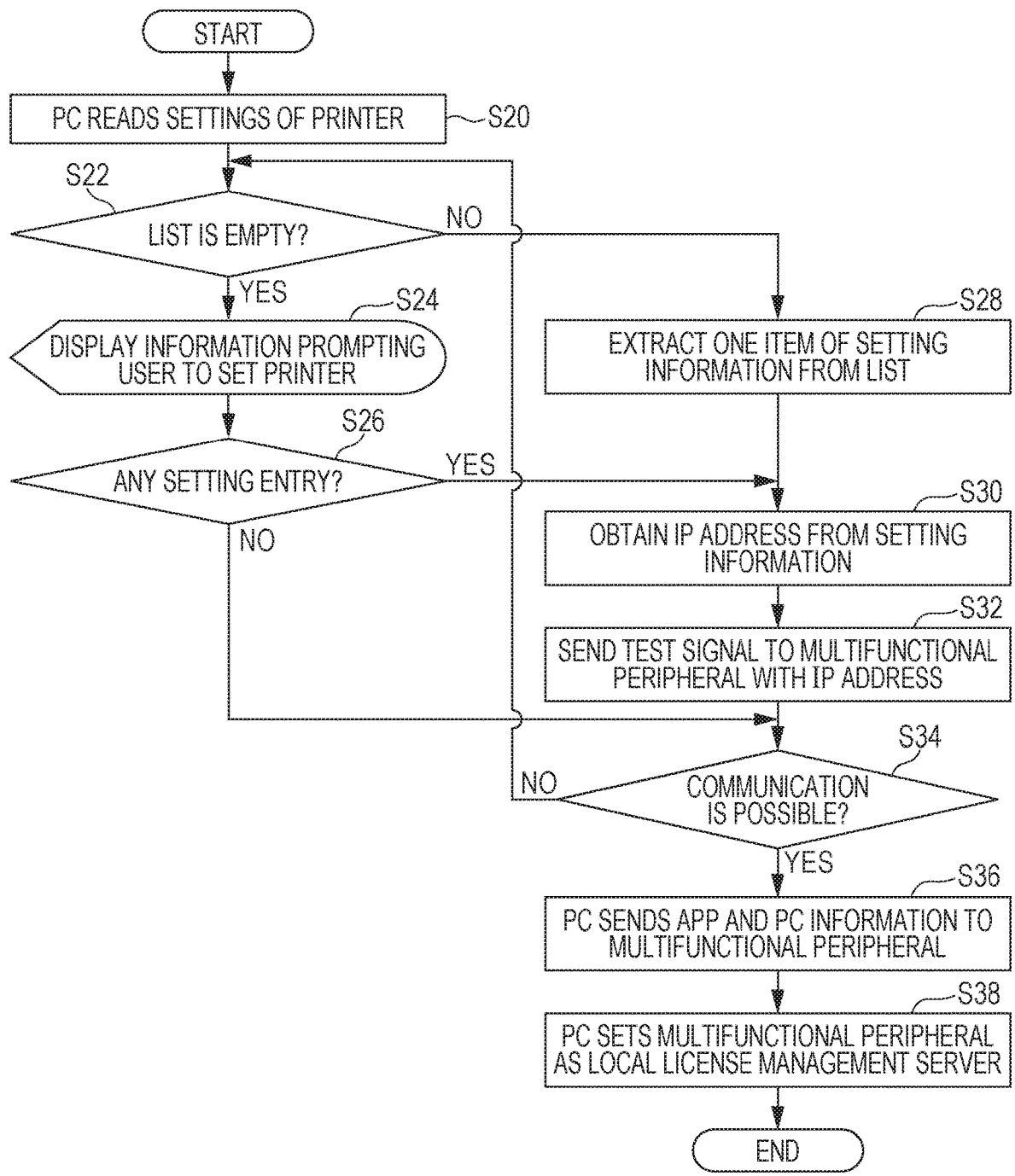
FIG. 12 is a flowchart illustrating another exemplary process of setting the license management server.

Referring next to FIG. 12, the mode of selecting a multifunctional peripheral 34 serving as a license management server by using another method will be described. In the example illustrated in FIG. 12, the PC 32 first reads the settings in the printer setting unit 70 (S20). It is checked whether a list of printers in the printer setting unit 70 is empty (S22). A list of printers refers to the settings of usable printers, as illustrated in FIG. 4. If the list is empty, a message prompting the user to set a printer is displayed on the touchscreen of the UI 58 of the PC 32 (S24).

Referring now to FIGS. 13 and 14, the procedure in step S24 will be described. FIG. 13 is a diagram illustrating an example of a window displayed on the touchscreen in step S24. On the window, the message "No printer settings are found. Would you like to set a printer first?" is displayed. Below the message, three buttons, namely, "set printer", "set license management server", and "cancel", are displayed.

In the case where the user presses the "set printer" button, the printer setting unit 70 displays a setting screen. In the case where the user selects, for example, a multifunctional peripheral 34 that the user wants to use in accordance with the screen display, a printer driver is installed as needed. Accordingly, the printer is set as illustrated in FIG. 4.

In the case where the user presses the "set license management server" button, a window illustrated in FIG. 14 is displayed. On this window, the message "Enter the license management server", a display entry section, a cancel button, and a setting button are displayed. The user enters the IP address, apparatus name, or the like of an apparatus that has a function as a license management server in the display entry section, and presses the setting button, thereby setting a license management server. As the license management server, an apparatus other than a multifunctional peripheral may be entered. In contrast, if the user presses the cancel button, the window returns to the window illustrated in FIG. 13.

Referring back to FIG. 12 again, the description will be continued. After step S24, the PC 32 checks whether there is a printer setting entry (S26). If there is a setting entry, the process proceeds to step S30. If there is no setting entry, the process proceeds to step S34.

If the list of printers is not empty in step S22 (that is, if there is a list of printers), one item of setting information is extracted from the list (S28). Extraction may be performed on the basis of priority information on a default printer, as in the exemplary embodiment illustrated in FIG. 11. Alternatively, for example, a multifunctional peripheral 34 that may serve as a license management server may be selected on the basis of availability information indicating the availability of a function to serve as a license management server. Information indicating the availability of a function to serve as a license management server may be obtained from, for example, the installer 84 or the license-related information 86 or 66. In yet another exemplary mode, in the case where requirement information defining requirements as a license management server is set in the installer 84, a multifunctional peripheral 34 that satisfies this requirement information is selected. The requirements include, for example, the manufacturer name and the model name of a multifunctional peripheral 34. In another example, selection may be made on the basis of information indicating whether there is a communication port for a license management server, or information indicating whether there is an IP address for a license management server. What requirements each printer satisfies may be obtained from, for example, information such as the manufacturer name and the model name included in the printer driver 72.

In step S30, the IP address of the multifunctional peripheral 34 is obtained from the information extracted in step S28 or the information set and entered in step S26 (S30). A test signal is sent to the multifunctional peripheral 34 having the IP address (S32). As a result of sending the test signal, it is determined whether communication is possible (S34). In the case where there is no setting entry in step S26, it is determined in step S34 whether communication is possible.

If communication is possible, the PC 32 sends app information and information on the local PC 32 to the multifunctional peripheral 34 (S36). Accordingly, the multifunctional peripheral 34 updates the license ownership/usage DB 110. In addition, the license processor 76 of the PC 32 sets the multifunctional peripheral 34 as a local license management server (S38). If communication is not possible in step S34, the processing from step S22 onward is repeated. In order to avoid an infinite loop, when a situation where communication is not possible continues for a predetermined number of times or for a certain time, a message to that effect is displayed to the user to end the process.

In the mode illustrated in FIG. 12, even when no default printer has been set, a license management server is set on the basis of information on the settings of other printers. In the case where no printer has been set, as illustrated in FIGS. 13 and 14, the work of setting a license management server may be performed.

(3) Distribution in Floating Licensing

Figure 15:
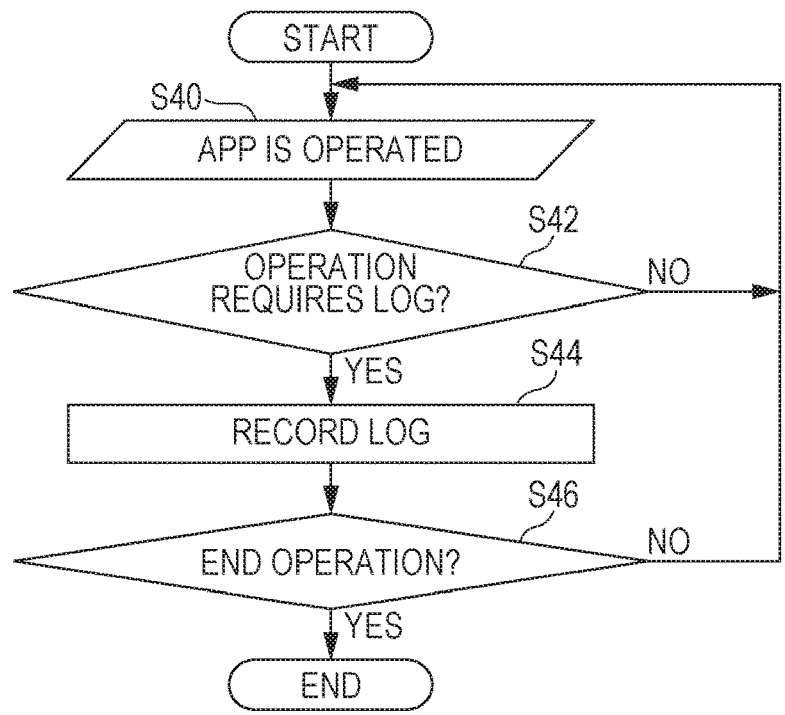
FIG. 15 is a flowchart illustrating the flow of a log recording process.
Figure 16:
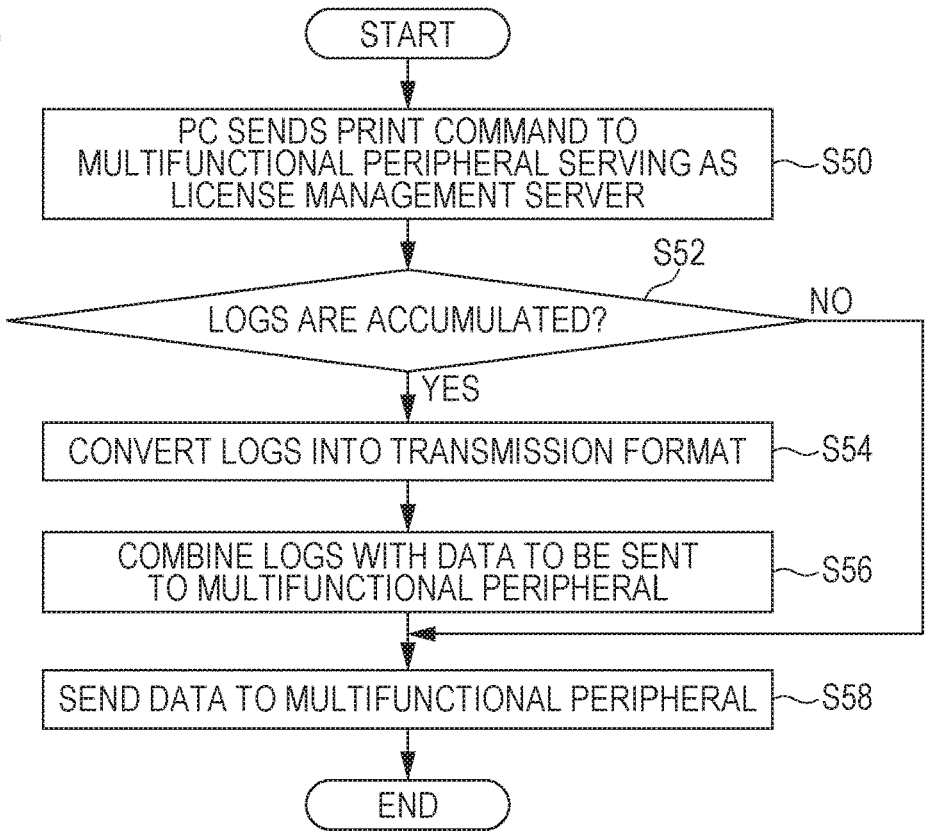
FIG. 16 is a flowchart illustrating the flow of a log sending process.

Referring next to FIGS. 15 and 16, a process of license re-distribution in floating licensing will be described. In this process, license re-distribution based on floating licensing is performed using the log 74 illustrated in FIG. 3.

FIG. 15 is a flowchart illustrating the flow of a process of recording the log 74 in the PC 32. In response to an operation on an app (S40), it is determined whether the operation is an operation that requires a log (S42). An operation that requires a log may be set appropriately. For example, it is conceivable to record a log for an operation of activating an app, an operation of saving information created using an app, an operation of performing printing using an app, an operation of communicating with an external apparatus using an app, and an operation of terminating an app. If the operation is not an operation that requires a log, the process returns to step S40. In contrast, if the operation is an operation that requires a log, the log 74 is recorded (S44). Then, it is determined whether the operation involving log recording is a termination operation (S46). If the operation is not a termination operation, the process returns to step S40, and, if the operation is a termination operation, the recording work ends. Accordingly, a series of operations from the activation to the termination of an app is recorded as the log 74.

FIG. 16 is a flowchart illustrating a process of sending the log 74 to the multifunctional peripheral 34. It is assumed that the PC 32 gives a print command to the multifunctional peripheral 34 serving as a license management server (S50). This print command may be given from an app serving as a target of license management, or from another app. In this case, the PC 32 determines whether the logs 74 are accumulated (S52). Whether the logs 74 are accumulated may be determined by comparison with a preset value. For example, there is a mode in which, in the case where the activation to the termination of an app is counted as one time, a value that is one time or multiple times is set, and, if there are logs 74 equivalent to the set value, it is determined that the logs 74 are accumulated. Alternatively, it is determined that the logs 74 are accumulated in the case where the data size of the logs 74 exceeds a certain value. In the case where the logs 74 are accumulated, the logs 74 are converted to a format compatible with a transmission protocol (S54), combined with data for a print command to be sent to the multifunctional peripheral 34 (S56), and sent to the multifunctional peripheral 34 (S58). In contrast, in the case where the logs 74 are not accumulated, data for a print command is simply sent to the multifunctional peripheral 34 (S58).

Accordingly, the multifunctional peripheral 34 serving as a license management server may analyze the logs 74 to analyze the usage of the app. The analysis result is compared with the usage at another multifunctional peripheral 34 serving as a license management server, and the number of managed licenses is re-distributed. As a specific example, there is a mode in which the number of licenses is re-distributed so that a user who is fully utilizing the app, not a user who is merely activating the app, may reliably use the app.

The above description describes floating licensing by way of example. However, the exemplary embodiment is not limited to floating licensing, and is adaptable to, for example, node-locked licensing.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor and memory,
   the memory storing information on a plurality of image forming apparatuses capable of making an image forming request,
   the processor being configured to
      install license-managed software,
      select an image forming apparatus serving as a license management server of the software from the plurality of image forming apparatuses, and
      set the selected image forming apparatus as a license management server.

2. The information processing apparatus according to claim 1, wherein:
   the processor is configured to
      obtain identification information for identifying an image forming apparatus normally used by the information processing apparatus, and
      on a basis of the obtained identification information, select the normally used image forming apparatus as the license management server.

3. The information processing apparatus according to claim 1, wherein:
   the processor is configured to
      obtain availability information indicating availability to serve as the license management server, and
      on a basis of the availability information, select an image forming apparatus serving as the license management server.

4. The information processing apparatus according to claim 1, wherein:
   the processor is configured to
      obtain requirement information on a requirement of the license management server, the requirement information being set in an installer of the software, and
      on a basis of the requirement information, select an image forming apparatus serving as the license management server.

5. The information processing apparatus according to claim 1, wherein:
   the memory stores a driver for the plurality of image forming apparatuses, and
   the processor is configured to select, on a basis of a setting of the driver, an image forming apparatus serving as the license management server.

6. The information processing apparatus according to claim 1, wherein:
   the processor is configured to select, as the license management server, an image forming apparatus that includes, besides a communication port for receiving the image forming request, a communication port as the license management server.

7. The information processing apparatus according to claim 1, wherein:
   the processor is configured to select, as the license management server, an image forming apparatus that has, besides an Internet Protocol (IP) address for receiving the image forming request, an IP address as the license management server.

8. The information processing apparatus according to claim 1, wherein:
   in a case where an image forming apparatus serving as the license management server is unselectable from the plurality of image forming apparatuses, the processor installs a driver for making an image forming request in a new image forming apparatus, and sets the new image forming apparatus as the license management server.

9. The information processing apparatus according to claim 1, wherein:
   a license of the software is managed using floating licensing, and
   when making an image forming request to an image forming apparatus set as a license management server, the information processing apparatus sends information indicating usage of the software in the information processing apparatus.

10. An image forming apparatus comprising:
    an image forming mechanism that receives an image forming request from an information processing apparatus and forms an image; and
    a license management mechanism that performs license management of software installed in the information processing apparatus,
    wherein, on receipt of a request for license management from the information processing apparatus, the image forming apparatus serves as a license management server for the information processing apparatus.

11. The image forming apparatus according to claim 10, wherein the image forming apparatus includes, besides a communication port for receiving an image forming request, a communication port for receiving information as a license management server.

12. The image forming apparatus according to claim 10, wherein the image forming apparatus has, besides an IP address for receiving an image forming request, an IP address as a license management server.

13. An information processing apparatus comprising:
    means for storing information on a plurality of image forming apparatuses capable of making an image forming request;
    means for installing license-managed software;
    means for selecting an image forming apparatus serving as a license management server of the software from the plurality of image forming apparatuses; and means for setting the selected image forming apparatus as a license management server.

\* \* \* \* \*